Oct. 22, 1957 A. H. ALSINA 2,810,410
CRANK-DRIVEN JIG SAW WITH FLEXIBLE TRANSMISSION MEANS
Filed March 31, 1955 2 Sheets-Sheet 1
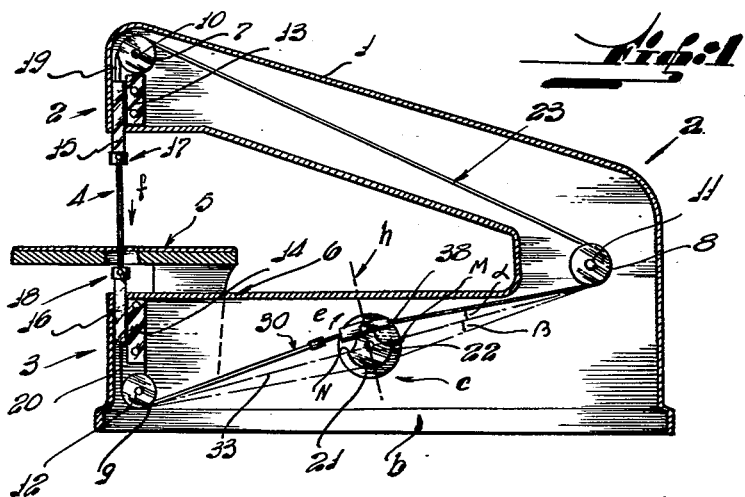
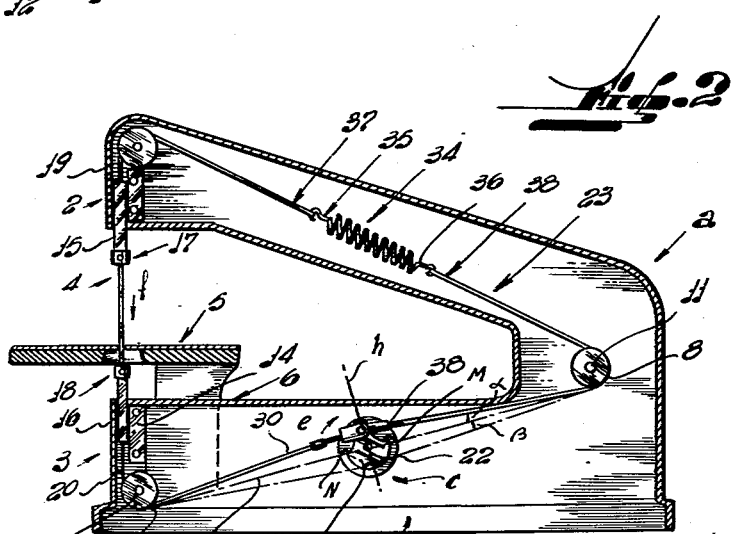
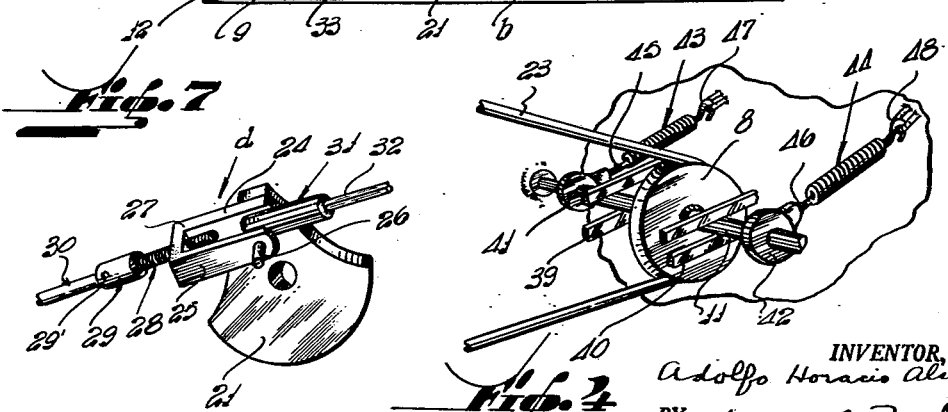
INVENTOR,
Adolfo Horacio Alsina
BY
Attorney

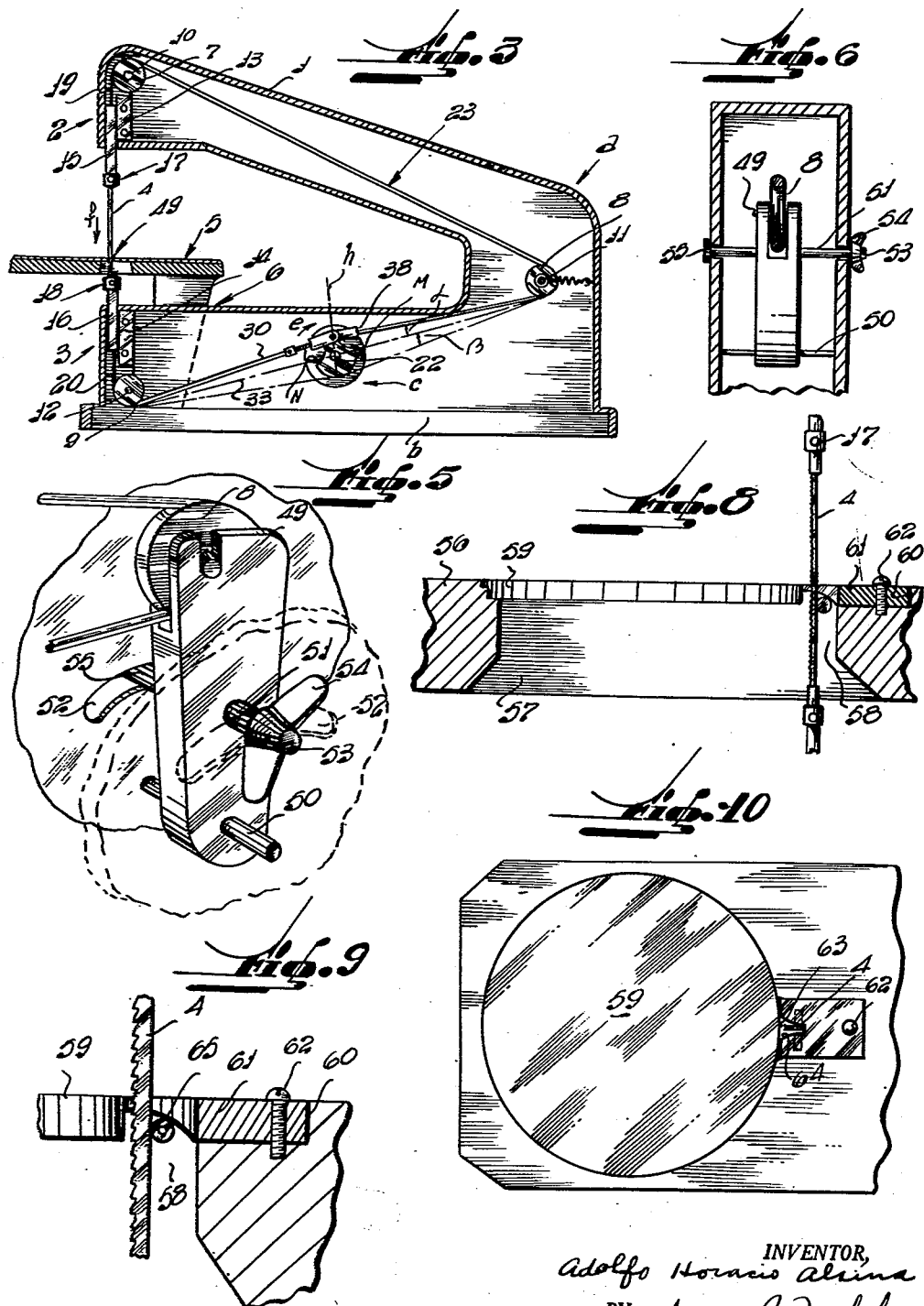

United States Patent Office

2,810,410
Patented Oct. 22, 1957

2,810,410

CRANK-DRIVEN JIG SAW WITH FLEXIBLE TRANSMISSION MEANS

Adolfo Horacio Alsina, Acassuso, Argentina

Application March 31, 1955, Serial No. 498,294

3 Claims. (Cl. 143—70)

This invention relates to a saw having a saw-blade with rectilinear alternating movement.

So far known saws, having rectilinearly alternating moving saw-blade comprise a vertically arranged saw-blade supported between two clamps which are driven with a rectilinear alternative movement by means of a driving mechanism operated by a driving source or mechanism such as an electric motor. In most of the known saws the driving mechanism drives only one of the clamps, whilst the saw-blade is maintained under tension by means of a spring which links the other clamp to a rigid frame of the saw.

The main feature of the saw of the present invention resides in that both clamps are inter-related and are alternatively driven through the same tensioning member which forms together with the saw-blade a continuous flexible system, adapted to be linearly displaced with a to and fro movement and maintaining substantially constant the tension on the saw-blade.

This arrangement avoids that the tension applied to the saw-blade, as well as the driving force produced by the driving mechanism are subject to substantial changes during the driving operation, as happens in the known saws, so that in the saws of the present invention a more even and regular working operation is performed. On the other hand, the fact that both clamps are alternatively driven or pulled by the driven mechanism, avoids that the saw-blade may eventually be blocked in the blank to be cut with the result that the saw-blade is not subject to inadmissable flexions which would tend to break the saw-blade.

Another feature of the invention resides in that the supporting plate on which the blank is to be guided and slid includes guiding means and supporting means for the saw-blade together with the additional known means used in this kind of saws, which tend to avoid an undue deviation or displacement of said saw-blade during the cutting or sawing operation.

These and further features, objects and advantages of the present invention will become more apparent during the course of the following description, in which by way of example several preferred embodiments are described and shown in the accompanying drawings.

In the drawings:

Fig. 1 is a side view partially in longitudinal section of a saw, in accordance with the present invention, in which the essential parts forming said saw have been schematically shown.

Fig. 2 is a similar side elevation as Fig. 1, but with the difference that the tensioning element which relates both clamps includes an elastic means for compensating the periodical elongations and shortenings which said tensioning element is subject to during the operation of the machine, as will be later seen.

Fig. 3 is likewise a similar side elevation as Figure 1 of another embodiment of a saw of the present invention, in which the compensation of the elongations is carried out by means of one of the pulleys over which passes the flexible tensioning element or member, which arrangement even permits to control the elastic tension of the system.

Fig. 4 (Sheet 1) is a detail in perspective view of the mounting of the pulley.

Fig. 5 represents a detail in perspective view of one way of mounting a pulley, which enables to control the tension of the moving system of the machine and facilitates the mounting of the saw-blade.

Fig. 6 is a partial sectional view of the machine, showing the device represented in Fig. 5.

Fig. 7 (Sheet 1) shows in perspective view a detail of the driving mechanism, which is used in all the above mentioned embodiments.

Fig. 8 is a sectional view of the supporting plate, showing elements arranged in the former for the guidage and support of the saw-blade.

Fig. 9 is an enlarged detail of part of Fig. 8.

Fig. 10 is a plan view of the supporting plate, in which the arrangement of the cross-guide of the saw-blade may be appreciated.

As may be seen in the drawings, the saw in accordance with the present invention consists of a rigid, hollow frame generally identified by reference numeral $a$, which is arranged on a platform identified by reference numeral $b$.

Said frame as shown by reference 1 may be built by metal plates, for instance, and said frame defines a housing for the driving mechanisms for the periodical alternative or rectilinear alternative movement of the clamps which support the cutting blade or saw-blade.

As is known in this type of machine the shape of the frame is that of an arch between the ends 2 and 3 of which the saw-blade 4 is arranged passing through the supporting plate 5 which on its turn is mounted on the lower part 6 of said frame.

Inside said frame three pulleys 7, 8 and 9 are arranged and which pulleys are rotatably mounted on shafts 10, 11 and 12, respectively, and it has to be pointed out that shafts 10 and 11 are parallel and within the same vertical plane.

Two inner members 13 and 14, rigidly connected to the inside of said frame $a$ form the guide for the clamps 15 and 16 between the ends 17 and 18 of which the saw-blade 4 is mounted. These clamps may be of any conventional suitable type, that is to say adapted to support the saw-blade in such a way as to avoid rotation of the latter.

In turn, the clamps 15 and 16 are linked to the ends 19 and 20 of a flexible tensor which fits in the groove of the pulleys above mentioned and which tensor is linked in an intermediate portion to a driving mechanism generally identified by reference numeral $c$.

Said tensor may be made of any material which supplies the necessary features of flexibility and mechanical resistance, such as a cylindrical leather belt of the type usually used for transmitting small driving forces (watchmaker's lathe).

The driving mechanism comprises an eccentric 21 mounted on shaft 22 to which a link is pivoted and identified by reference numeral $d$ (see Figure 7) by means of which said driving mechanism is connected to a flexible tensor 23 (see Figure 1).

This link is formed by means of a U-shaped member having lateral branches 24 and 25 (see Figure 7) through which passes a stub 26 forming part of the eccentric 21 and which U-shaped member has in its base portion 27 a threaded bore to enable to screw a control screw 28 therein and which in one of its free ends 29 supports the end 30 of the flexible tensor 23 linked to said end 29 by means of pin 29'.

Between both branches 24 and 25 of the U-shaped member, another member 31 is pivotally supported by crank pin 26 and which member 31 acts as a supporting element of end 32 of the same flexible tensor 23.

Consequently, the link $d$ is a prolongation of the tensor and its free ends 30 and 32, and at the same time it enables to adjust the correct position of the saw-blade 4.

It should be pointed out that shaft 22 of eccentric 21 and which forms part of the driving mechanism $c$ may be placed in any intermediate position with regard to pulleys 8 and 9, but in order to reduce to a minimum the elongation of the tensor during the operation and likewise to reduce the lateral forces induced on the eccentric 21, it is advisable that said shaft 22 is intercepted by the tangent 33 common to both pulleys 8 and 9 and approximately equidistant to both, as shown in Fig. 1 and as will be demonstrated later on, when explaining the operation of the machine.

In fact the rotation of eccentric 21 mounted on said shaft 22 driven by a motor, not shown, has the effect that crank pin 26, on which link $d$ is mounted, describes a circular path and said crank pin is driven with a continuous rotary movement; in Fig. 1 it is assumed that the eccentric rotates in clockwise direction as indicated by arrow $e$.

Due to said rotary movement and starting at the position shown in Fig. 1, it may be seen that on the end 30 of the flexible tensor 23 a pulling effect is exerted which, when transmitted to clamp 16, produces a descending movement of the saw-blade 4 in the direction indicated by arrow $f$.

When pin 26 passes by the dead center M—determined by the tangent 33 common to both pulleys 8 and 9—the pulling effect is transmitted to end 32 of flexible tensor 23 and through the latter it is transmitted to clamp 15 which thereby pulls the saw-blade 4 in a rectilinear movement in opposite direction to that indicated by reference numeral $f$.

This last mentioned pulling effect ceases when pin 26 reaches dead center N diametrically opposed to dead center M and also located on tangent 33 common to pulleys 8 and 9.

The path of the saw-blade is thus defined by the distance between the two dead centers M and N, distance which is equal to the diameter of the circumferential path of pin 26 of the eccentric.

As may be seen, in each cycle or complete rotation of said eccentric, the flexible tensor 23 is alternatively displaced angularly through angles $\alpha$ and $\beta$ of Fig. 1 the total magnitude of which, measured of line $h$, perpendicular to the tensor, is equal to the diameter of the circumferential path defined by the eccentric.

As a consequence of these angular displacements, the tensor 23 is subject to alternative elongations and shortenings, which in the embodiments shown in Figure 1 are substantially integrally absorbed by the elasticity of said tensor.

Likewise in Figure 1 it may be seen that since shaft 22 passes through tangent 33 common to both pulleys 8 and 9, angles $\alpha$ and $\beta$ are equal and adjacent. Thus the elongations and shortenings to which tensor 23 is subject to, are reduced to a minimum as well as the lateral forces induced by the tensor on the eccentric.

In the embodiment shown in Figure 2, the tensor is provided with elastic means such as a spring 34, the ends 35 and 36 of which are respectively linked to the ends 37 and 38 of said tensor 23.

This spring has, as its main function, to compensate the elongations previously referred to, in case the elasticity of the flexible tensor 23 is not sufficient to absorb said elongations.

In the modified embodiment shown in Figures 3 and 4, the same compensating effect is obtained by means of pulley 8; the shaft 11 of which instead of being stationarily mounted is slidably supported by a pair of guides 39 and 40 and is further supported by a pair of bearings 41 and 42 connected to and integral with a pair of tensioning springs 43 and 44 which, by means of their respective ends 45 and 46 are rigidly linked to said bearings, whilst their other ends 47 and 48 are linked to the frame of the saw.

In this embodiment the pulley 8 is constantly biased by springs 43 and 44 which maintain the tensor 23 under tension and absorb, as has already been mentioned in connection with the other embodiment, the periodical elongation to which said tensor is subject to during the operation of the saw.

In another embodiment shown in Figures 5 and 6, the shaft 11 of pulley 8 is mounted in a swingable bracket 49 pivoted on pivot 50 which is supported by the frame of the saw.

The bracket 49 is provided with a stub shaft 51 supported at an intermediate portion, and which ends of said stub shaft pass through two arcuated slots 52 arranged in the frame. In order to locate the bracket 49 in its correct position stub shaft 51 (see Figure 6) has a threaded end 53 on which a control screw 54 is mounted whilst immediately adjacent to the other end or head 55 the stub shaft 51 has a suitably shaped portion so that the latter is slidably but not rotatably housed in slot 52 whereby the control screw 54 may be correctly operated.

This arrangement enables not only to control the tension of tensor 23, but likewise facilitates the mounting of the saw blade 4, since when pulley 8 is displaced towards the left end position in the drawing, that is to say towards the ends 2 and 3, the clamp 17 may be lowered without overcoming the elastic resistance of the tensor. It should be added that this last embodiment may be combined with the modified embodiment shown and described in connection with Figure 2.

Referring now to the supporting plate shown in Figures 8, 9 and 10, it may be seen that the latter comprises the stationary frame 56 having an opening 57 through the portion 58 of which the saw blade 4 slides. Opening 54 is generally of circular shape and the edge defining said opening comprises a recess on which a disc 59 is mounted and on which the blanks are guided.

Adjacent to portion 58, a housing 60 is arranged in which a guide 61 is adjustably mounted by means of screw 62. This guide 61 faces the edge of disc 59 and comprises a substantially V-shaped recess 63 defined by arcuate edges 64 between which the saw blade 4 passes. Directly underneath guide 61 a supporting roller 65 is arranged which has to absorb the thrust to which the saw blade 4 is subject to, due to the advancing movement of the blank to be cut.

The particular shape of recess 63 assures that transversal movements of the inoperative edge of the saw blade with regard to its cutting movements are avoided at the same time as the operative edge, that is to say the teeth will not enter in contact with any metallic edge of the disc 59. In turn roller 65, arranged at a very small distance of the plane through which the blanks are slid, assures that the former is capable of absorbing large thrusts to which the saw blade is subject, without damaging said saw blade.

This guide and thrust absorbing system of the saw blade 4 is particularly important in the above described saw, especially in those cases where the additional spring arrangement is not used since in that event any lateral or frontal movement of the saw blade would transmit large thrusts to the tensor 23.

I claim:

1. A saw with rectilinear alternative movement comprising, a saw blade, a pair of clamps for supporting said saw blade, a flexible tensor, a plurality of pulleys supported by said frame and about which said tensor is arranged, said flexible tensor comprising two flexible portions, each of said portions having an end connected to the respective clamp and a free end, a continuous driving mechanism comprising a driving shaft and an eccentric, said eccentric being mounted on said guiding shaft, a link pivotally connected to said eccentric, the free ends of said portion being connected to said link, and means in said link for adjusting the correct position of the saw blade.

2. A saw with rectilinear alternative movement comprising, a frame, a saw blade, a pair of clamps for supporting said saw blade, a flexible tensor, a plurality of pulleys supported by said frame and about which said flexible tensor is arranged, said flexible tensor comprising two flexible portions, each of said portions having an end connected to the respective clamp and a free end, a continuous driving mechanism comprising a driving shaft and an eccentric having a crank pin, said eccentric being mounted on said driving shaft, a link pivotally mounted on said crank pin, the free ends of said portions being connected to said link, means in said link for adjusting the correct position of the saw blade, control means for controlling the tension of said flexible tensor, said control means comprising a bracket having supporting means for supporting one of the shafts corresponding to one of said pulleys, a pivot supported by said frame, said bracket being pivotally supported by said pivot, a pair of slots in said frame, a stub shaft mounted in said bracket entering and guided by said pair of slots, and locking means on said stub shaft for locking the latter to said frame.

3. A saw with rectilinear alternative movement comprising, a frame, a saw blade, a pair of clamps for supporting said saw blade, a flexible tensor, comprising two flexible portions, each of said portions having an end connected to the respective clamp and a free end, a continuous driving mechanism comprising a driving shaft and an eccentric having a crank pin, said eccentric being mounted on said driving shaft, a link pivotally mounted on said crank pin, said link comprising a U-shaped member having a base portion and lateral branches, said lateral branches being pivotally mounted on said crank pin, a threaded bore in said base portion, a control screw having a threaded end and a free end, said threaded end being screwed in said bore, said free end being connected to the free end of one of said portions, a member having a second free end, pivotally mounted on said crank pin and between said branches, said second free end being connected to the free end of the other flexible portion.

References Cited in the file of this patent

UNITED STATES PATENTS

| 138,103 | Smith | Apr. 22, 1873 |
| 334,175 | Kratzer | Jan. 12, 1886 |
| 461,325 | Deniston | Oct. 13, 1891 |
| 492,511 | Horn | Feb. 28, 1893 |
| 984,398 | Sievert | Feb. 14, 1911 |
| 1,498,135 | Uden | June 17, 1924 |
| 1,820,294 | Anderson | Aug. 25, 1931 |
| 2,476,573 | Whicher | July 19, 1949 |
| 2,700,402 | Walden | Jan. 25, 1955 |

FOREIGN PATENTS

| 60,760 | Sweden | May 11, 1926 |
| 717,342 | France | Oct. 19, 1931 |
| 1,015,962 | France | Aug. 13, 1952 |